Sept. 4, 1962    D. T. MEISENHEIMER, JR., ETAL    3,052,777
PISTON TYPE PRESSURE SWITCH HAVING NOVEL PRESSURE SEALING MEANS
Filed Oct. 2, 1959    2 Sheets-Sheet 1

INVENTORS
DANIEL T. MEISENHEIMER, JR.
LOUIS W. SYARTO
BY
ATTORNEYS

Sept. 4, 1962   D. T. MEISENHEIMER, JR., ETAL   3,052,777
PISTON TYPE PRESSURE SWITCH HAVING NOVEL PRESSURE SEALING MEANS
Filed Oct. 2, 1959                                    2 Sheets-Sheet 2
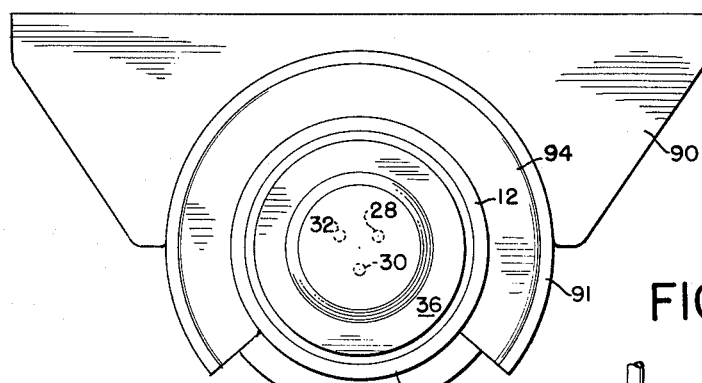
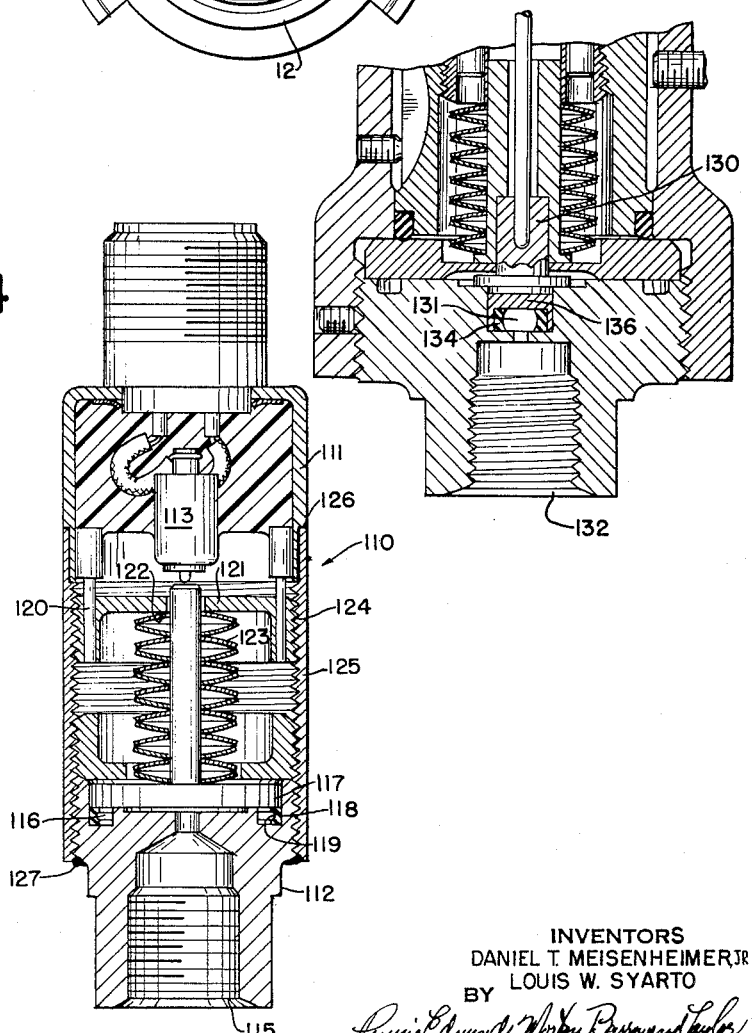
INVENTORS
DANIEL T. MEISENHEIMER, JR
LOUIS W. SYARTO
BY
ATTORNEYS

United States Patent Office 3,052,777
Patented Sept. 4, 1962

3,052,777
PISTON TYPE PRESSURE SWITCH HAVING
NOVEL PRESSURE SEALING MEANS
Daniel T. Meisenheimer, Jr., 50 Morris Lane, Milford, Conn., and Louis W. Syarto, 184 Highlawn Road, Fairfield, Conn.
Filed Oct. 2, 1959, Ser. No. 844,030
12 Claims. (Cl. 200—83)

The present invention relates generally to switches adapted to be actuated by a reference pressure and, more particularly, to a novel means for sealing a movable piston in a pressure switch wherein the switch actuation pressure is employed to increase the sealing effects of the piston seal.

The present invention contemplates improvements in the construction of piston operated fluid pressure switches of the type wherein the switch and switch-actuating mechanism are enclosed substantially completely within a housing. Prior switches of known construction have employed pistons which move in response to some reference pressure in order to actuate the switch. In most known constructions, the piston moves in response to the reference pressure which is permitted to build up within a pressure chamber until sufficient pressure is reached to overcome the resistance of a spring or similar component whereby the piston will then be moved to actuate a switch. It is essential in a construction of this type that adequate sealing of the pressure chamber be provided particularly with respect to those portions accommodating the moving piston. Ordinarily, as pressure builds up within the chamber, the efficiency of the piston seal tends to decrease due to leakage which ordinarily becomes greatest at higher pressures. This effect can cause variations in switch actuation pressures and becomes critical in applications where precision is of paramount importance.

Accordingly, the present invention provides a pressure seal for a piston which is constructed in such a manner that upon an increase of the pressure acting upon it, the sealing effect thereof will be increased.

As a more specific aspect of the invention, an annular seal is provided which is disposed about a portion of a piston or shank which is slidably movable through the wall of a pressure chamber. The seal has surfaces which abut the slidable portion of the piston and the wall of the chamber so that leakage past the slidable portion of the piston and through the wall of the chamber is prevented. At least one side of the annular seal is exposed directly to the pressure within the chamber and the side so exposed is concave. The pressure will act upon the concave surface, tending to flatten the seal against the piston shank and the wall of the chamber through which it slides, thus causing the seal to exert a sealing effect which increases with pressure. In a preferred embodiment, the piston has also been equipped with a pressure surface of enlarged diameter and the seal is maintained in compression between the section of enlarged diameter and the upper wall of the pressure chamber. Upward movement of the piston tends to increase the compression of the seal and to contribute to the pressure sealing effect.

In another form of the invention, an upwardly movable piston forms the upper wall of a pressure chamber. Disposed about the periphery of the chamber and in sealing relationship with the edge of the piston is an annular seal having one concave surface directly exposed to pressure within the chamber. In this embodiment, the seal is maintained initially in compression by the piston in its unactuated position. This compression is reduced when the piston moves upwardly in response to pressure within the chamber. However, leakage around the edge of the piston is prevented since the seal tends to become flattened at higher pressures and the sealing relationship between the seal and upwardly moving piston is maintained.

The invention also provides novel piston-actuated pressure switches in combination with the sealing arrangements just described. These and other aspects of the invention will become more readily apparent upon a detailed examination of the following description and the accompanying drawings, in which:

FIG. 3 is a top view of the switch shown in FIG. 1;

FIG. 4 is a cross-sectional view of a modification of a pressure switch in combination with a piston seal constructed according to the invention; and FIG. 5 is a cross-sectional view of a modification of the pressure switch of FIG. 2.

Figure 2:
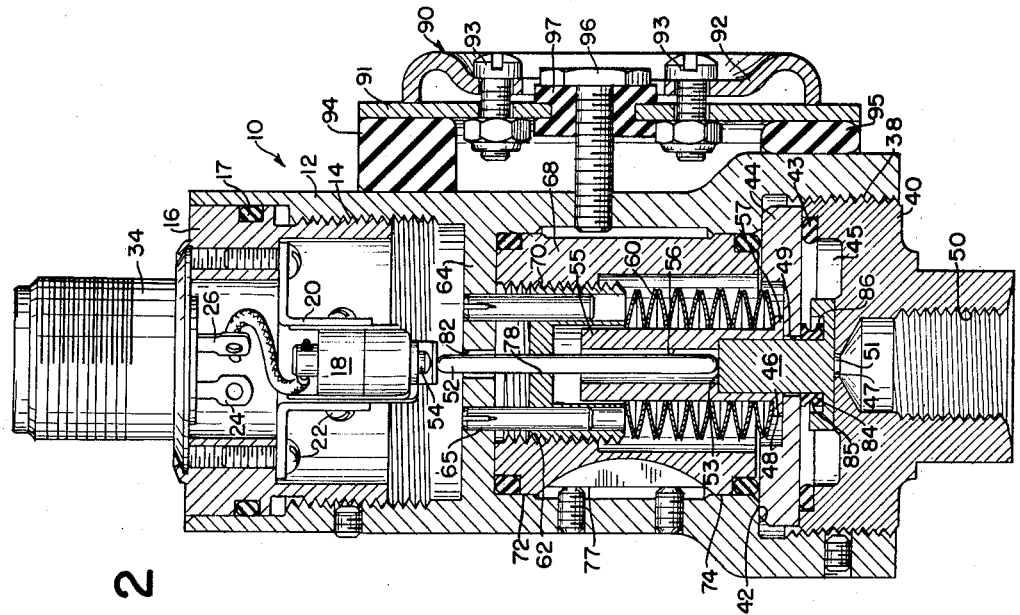
FIG. 2 is a cross-sectional view taken along the lines 2—2 of FIG. 1 which shows a piston-type pressure switch employing a piston seal according to the invention.

With reference to FIG. 2, a pressure switch 10 constructed according to the present invention has been illustrated. Switch 10 includes a substantially hollow longitudinal body member 12 of rigid single piece construction. At its upper end, body member 12 has been provided with internal threads 14 which are adapted to engage in corresponding threaded relationship with an externally threaded end member or plug 16. Plug 16 has been provided with an O-ring seal 17 so that when the parts 12 and 16 are threaded together, a sealed closure of the upper end of member 12 will be effected. Plug 16 serves as a mount for a small electrical switch 18 which is attached to the underside thereof by means of a bracket 20 and mounting screws 22. Switch 18 has been provided with terminals 24 and 26 which are connected externally of the switch housing to a suitable mechanism which is to be controlled by switch 18. Exterior terminals 28, 30 and 32 provided for this purpose, have been shown in FIGURE 3. The upper end of a terminal post 34 has been threaded externally so as to engage a polyethylene cap 36 which serves as a dust cover when the switch is not being used.

The lower end of the body member 12 is likewise provided internally with a series of threads 38 which are adapted to engage with corresponding external threads provided in a lower end plug 40. Body member 12 has been formed with an annular shoulder 42 against which a spacer 44 will abut when plug 40 has been brought into full threaded engagement with member 12. A seal 43 is compressed between the plug 40 and spacer 44 and will prevent leakage between these members. Plug 40 and spacer 44 define a pressure chamber 45 within which a piston 46 is located for limited upward movement. Piston 46 has been formed with a pressure surface 47 and a shank portion 48, the latter being adapted to slide in an opening 49 in spacer 44. Plug 40 has been provided with a port 50 which will be connected to a reference pressure. Port 50, at its upper end, is connected to the pressure chamber 45 by means of an orifice 51. By this means the reference pressure may act against the pressure surface 47 of piston 46 to cause upward movement of the piston. The movement of piston 46 will be transmitted to a push-rod 52 whose lower end rests against the upper surface 53 of shank 48 and whose upper end is in contact with an actuating button 54 forming part of switch 18.

Also forming a part of piston 46 is a cylindrical member 55 having a bore 56 adapted to permit the passage of the lower portion of push-rod 52. Cylindrical member 55 has been provided with an annular shoulder 57 at its base, which retains the lower end of a stack spring 60. The upper end of spring 60 abuts an adjustable collar 62. The action of the stack spring causes piston 46 to be resiliently loaded in a downward direction against the reference pressure found in port 50. Thus, actuation of switch 18 is prevented until a certain specific reference pressure is exceeded, this pressure being determined by the effective pressure surface area of the piston 46 and the pressure of the spring 60.

Means are provided for effecting a change in the spring force exerted against the actuating piston 46. Situated above piston 46, body member 12 has been formed having a transverse integral wall section 64 which contributes to the rigidity of the switch construction. In addition, wall 64 serves as a mounting support for a plurality of longitudinally-disposed pins 65. Pins 65 each have one end fastened within wall 64 so that the pins depend therefrom in a downward direction. Pins 65 serve to support collar 62 which is adapted to slide longitudinally thereon. The lower end of collar 62 abuts an upper portion of the spring 60 and will therefore cause a greater or lesser compression of the spring depending upon the longitudinal position of collar 62 within the housing. A rotatable actuating member 68 has also been provided, which is threadably engaged at 70 with collar 62. Actuating member 68 has an upper annular bearing surface 72 and a lower annular bearing surface 74 which corresponds in diameter to the internal diameter of body member 12. Actuating member 68 will thereby be guided in its rotation within body member 12 of the switch housing by the bearing surfaces 72 and 74.

Figure 1:
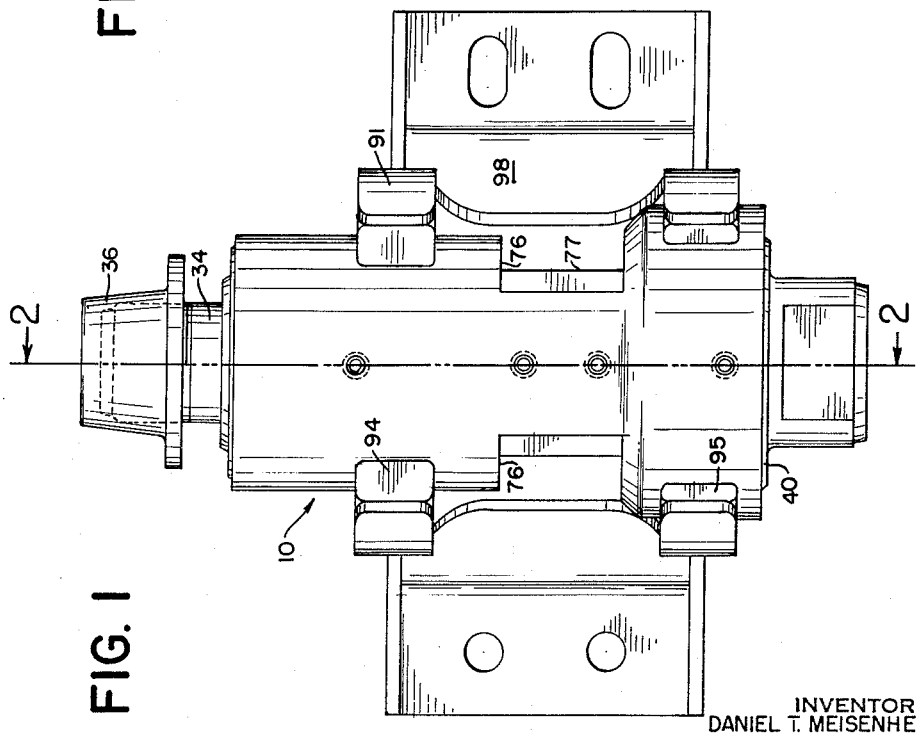
FIG. 1 is a side elevation of a pressure switch incorporating the present invention.

With reference to FIGURE 1, it will be observed that two oppositely disposed windows or openings 76 have been provided in the body member 12. At the same time, a portion of actuating member 68 has been provided with grooves or teeth 77 which are accessible through the openings 76. Teeth 77 may be engaged by a tool such as a screwdriver in order to cause rotation of actuating member 68 and thus adjustment of spring 60.

With reference to FIGURE 2, collar 62 has been provided with a central opening 78, which is adapted to receive an intermediate portion of push-rod 52. Collar 62 therefore assists in guiding push-rod 52 as it is moved longitudinally toward or away from switch 18. A longitudinally aligned passage 82 has also been provided in wall 64 to permit the passage of the upper end of push-rod 52.

The invention provides a novel pressure seal 84 which prevents leakage from pressure chamber 45 when piston 46 reciprocates therein. Seal 84 is disposed around piston shank 48 such that leakage from chamber 45 through opening 49 in spacer 44 will be prevented. Accordingly seal 84 has been constructed with three flat sealing surfaces and a concave pressure surface 85. One sealing surface lies against shank 48 opposite the concave surface 85 which is directly exposed to pressure within chamber 45. The remaining sealing surfaces are adapted to lie respectively against an annular shoulder 86 of piston 46 and a lower horizontal portion of spacer 44 immediately adjacent the opening 49.

Since the lower pressure surface 47 of piston 46 is not sealed against orifices 51 which connects reference pressure port 50 and chamber 45, as the reference pressure increases, it will be reflected within pressure chamber 45. As the pressure in chamber 45 increases, it acts upon the concave surface 85 of the piston seal 84, tending to flatten the seal against piston shank 48. This action has the effect of elongating the seal longitudinally and of forcing the three sealing sides against the surfaces of the piston and spacer. Thus, the higher the pressure becomes in chamber 45, the greater is the sealing effect which is exerted by seal 84.

During the short upward stroke of the piston 46, the seal 84 will be placed in compression between the shoulder 85 and spacer 44. This action of the piston against the seal tends to augment the pressure-sealing effect of the pressure within chamber 45 as it acts upon the concave surface 85 of the seal.

Seal 84 may be manufactured of rubber, a synthetic elastomer, or of fluorine-containing polymer such as polytetrafluoroethylene. In some cases, it may be advantageous to employ a flat annular metallic seal of concave cross-section, with the concave side being exposed to the sealing effects of pressure within chamber 45.

The operation of the pressure switch according to FIGURES 1–3 is as follows: The port 50 will be connected to a reference pressure which will act against the lower pressure surface 47 of piston 46. When the reference pressure has achieved a sufficient value, piston 46 will be deflected upwardly, thereby causing the piston to move push-rod 52 to actuate switch button 54 and switch 18. The effective pressure required to actuate the switch will depend upon the effective pressure area of the pressure surface 47 and upon the resisting pressure of spring 60. The resistance of spring 60 may be varied in order to change the actuating pressure of the switch. This is accomplished by inserting a tool such as a screwdriver through one of the windows 76 provided within the body member 12 of the switch housing and by rotating actuating member 68 to the right or to the left. The rotation of member 68 will cause collar 62 to translate upwardly or downwardly along pins 65. The travel of collar 62 will cause greater or lesser compression of spring 60, thereby adjusting the actuation pressure of the switch.

A modification of the invention has been illustrated in FIGURE 4. In this embodiment, an enclosed switch housing 110 has been provided with an upper enclosure member 111 and a lower enclosure member 112. A small switch 113 is mounted internally to the upper enclosure member 111. The lower enclosure member 112 has been provided with a reference pressure port 115 which leads to a pressure chamber 116 within the housing. The upper portion of pressure chamber 116 is formed by the pressure surface of an upwardly movable piston 117. Leakage past the edge of the moving piston 116 is prevented by an annular seal 118 which is situated within the pressure chamber. Seal 118 has three rectangularly disposed sealing surfaces, the uppermost of which abuts the edge of the piston 117. Seal 118 has also been provided with a concave side 119 which is exposed to the pressure within the chamber 116. The arrangement is such that the piston in its unactuated position maintains the seal under compression. When pressure begins building up within the chamber, the concave side 119 of the seal which is exposed to the pressure, causes the seal to flatten against the outer wall of chamber 116 and upwardly against the piston 117 so that as the piston moves upwardly, the sealing relationship will be maintained. The positioning of the seal within the chamber, in the manner shown, has the advantage that there is no frictional resistance between the seal and the sliding piston which is usually the case in ordinary piston seals. Consequently, the movement of the piston may be quite accurately calibrated in terms of the pressure required to move it since the frictional effect of the seal upon the movement of the piston is negligible.

As in the embodiments of FIGURES 1–3, means have been provided for varying the actuation pressure required to move the piston and to actuate the switch. It will be observed that a plurality of pins 120 are fixed to a portion of the upper enclosure member 111 and that a collar 121 is slidably mounted to the pins 120. Collar 121 is adapted at 122 to retain the upper end of a stack spring 123, whose lower end presses against the upper surface of the piston 117. Therefore, the resistance of spring 123 may be changed by moving the collar 121 upwardly or downwardly within the housing. This is accomplished by providing the collar with threads 124 which engage with the corresponding threads of an actuating member 125 which forms a part of the switch housing. When the upper enclosure member 111 is rotated opposite to the actuating member 125, collar 121, being restrained by the pins 120 will be caused to translate downwardly or upwardly. The portion 122 of collar 121 will, therefore, increase or decrease the compression of the stack spring 123. After the adjustment of the spring has been made and the switch has been calibrated to actuate the switch at a given pressure, the housing will be made pressure tight by applying a soft solder seal at the juncture of the upper enclosure member 111 as shown at 126 and also at the juncture 127 of the lower enclosure member 112 and the actuating member 125.

A further modification of the invention especially adapted for use with extremely high pressures has been shown in FIG. 5. This form of the invention is similar in its switch actuating portions to the other embodiments but is different in the provisions made for retaining the piston seal. Accordingly, a piston 130 is adapted for longitudinal movement in response to a reference pressure within a pressure chamber 131 admitted thereto by means of a pressure port 132. An annular sealing element 134 having three flat sealing sides and a concave inner side which is exposed to the pressure within chamber 131 is adapted to prevent leakage from chamber 131 past the piston. Sealing element 134 is supported by a cup-shaped retainer 136 which forms in effect, part of piston 130 and is movable therewith.

Thus, for example, it is conceivable that at extremely high pressures, the sealing element 118 such as provided in FIG. 4 could be extruded from chamber 116 past the edge of the piston 117. However, in the embodiment of FIG. 5, the cup shaped retaining member 136 insures that high pressure deformation will not cause an extrusion of sealing element 134 from pressure chamber 131.

Also illustrated in FIGS. 1–3 but forming no part of the present invention is a shock mount 90 which may be advantageously used to mount the present invention's pressure switch. Mount 90 comprises in general, two principal components, a vibration isolator 91 and a mounting bracket 92 which is attached thereto by some suitable means such as screws 93. Wherever vibration isolator 91 comes into contact with the switch housing, shock absorbent means such as strips 94 and 95 have been provided. Similarly, mounting bolt 96 is isolated vibrationally from member 91 by a shock absorbent grommet 97.

As will best be seen in FIGS. 1 and 3, vibration isolator 91 substantially encircles the switch housing and is itself encircled by upper and lower arms of the mounting bracket. The mounting bracket and switch may be secured by means of a web portion 98 to any appropriate structure.

It should be understood that the foregoing description of the invention is representative only. Various departures from what has been shown and described may be made within the spirit and scope of the appended claims.

We claim:

1. In a fluid pressure switch of the type having a housing, a port at one end of said housing adapted to be connected to a reference pressure, switch actuation means responsive to said pressure and movable thereby in one direction, and resilient means urging said actuation means in an opposite direction, the improvement comprising: a switch housing having a generally longitudinally disposed body, said housing also including two oppositely disposed end portions, a first end portion providing support for said switch, a second end portion defining said reference pressure port, said housing forming a pressure chamber having side wall and transverse end portions, a piston mounted for limited axial movement within said chamber, said piston defining portions of said chamber and having transverse wall portions, said piston being movable to change the volume of said chamber, axially-distortable sealing means located entirely within said chamber to prevent the escape of pressure fluid therefrom past said piston prior to and during movement of said piston to change the volume of said chamber, said sealing means being constructed such that increasing pressure within said chamber deforms said sealing means against a transverse wall portion of said piston and a transverse portion of said chamber formed by said housing, the axial dimensions of said sealing means being such in relation to the axial dimensions of said chamber that said sealing means is constantly maintained in sealing contact with a transverse wall portion of said piston and a transverse end portion of said chamber formed by said housing while remaining effectively stationary at all pressures, resilient means urging said piston against said reference pressure, and means transmitting movement of said piston to actuate said switch.

2. A fluid pressure switch according to claim 1 in which said piston defines upper transverse end wall portions of said chamber and said sealing means is located immediately below said piston, said sealing means comprises a continuous seal of axially distortable resilient material and is maintained in constant sealing contact with said chamber side wall portions and lower transverse end wall portions while maintaining sealing contact with said upper transverse end wall portions formed by said piston, and said sealing means is distortable in an axial direction with an increase in said reference pressure.

3. A fluid pressure switch according to claim 2 wherein said sealing means comprises a continuous seal of rubber or the like, said seal in cross-section having three sides generally rectilinearly disposed with respect to each other and one side of concave shape, only said concave side being directly exposed to said reference pressure so that said pressure tends to flatten said seal in a longitudinal direction and to seal the opening in the wall of said pressure chamber provided for the slidable portion of the piston.

4. In a fluid pressure switch of the type having a housing, a port at one end of said housing adapted to be connected to a reference pressure, switch actuation means responsive to said pressure and movable thereby in one direction, and resilient means urging said actuation means in an opposite direction, the improvement comprising: a switch housing having a generally longitudinally disposed body including two oppositely disposed end portions, the first end portion providing support for said switch, a second end portion defining said reference pressure port, said housing forming a pressure chamber having end and side wall portions, said reference pressure port connecting with said pressure chamber, a piston mounted for longitudinal movement within said chamber to change the volume thereof and at least partly forming an end wall portion of said chamber, a portion of said piston extending slidably through one end wall of said chamber, effectively stationary sealing means disposed around said slidable portion in contact therewith and in contact with said opposed end wall portions of said chamber, said sealing means being located entirely within said chamber and adapted to prevent the escape of pressure fluid therefrom past said piston, said sealing means being constructed such that an increase in pressure within said chamber deforms said sealing means into sealing contact with said opposed end wall portions, said sealing means being distortable in the direction of movement of said piston, resilient means for urging said piston against said reference pressure, and means transmitting the movement of said piston to actuate said switch.

5. A fluid pressure switch according to claim 4 wherein said sealing means comprises a continuous seal of rubber or the like, said seal in cross-section having three sides generally rectilinearly disposed with respect to each other and one side of concave shape, only said concave side being directly exposed to said reference pressure so that said pressure tends to flatten said seal in a longitudinal direction and to seal the opening in the wall of said pressure chamber provided for the slidable portion of the piston.

6. A pressure seal for a piston adapted for movement in a pressure chamber to increase and decrease the volume thereof comprising a stationary element situated entirely within said chamber and adapted to seal said chamber from leakage of pressure fluid past said piston, said element having sealing surfaces in contact with said piston and the walls of said chamber and having at least one concave surface exposed directly to pressure within said chamber, said exposed surface when acted upon by increasing pressure within said chamber tending to transmit said pressure to said sealing surfaces of said element such that the sealing effect of said element increases with increasing pressure.

7. A pressure seal according to claim 6 wherein said piston forms an upper wall of an expandable pressure chamber said seal is located immediately below said piston and is elongated and maintained in contact with said piston by increasing pressure within said chamber when said piston moves in a direction to increase the volume of said chamber.

8. A pressure seal for a piston adapted for movement in a pressure chamber to increase and decrease the volume thereof comprising a stationary element situated entirely within said chamber and adapted to seal said chamber from leakage of pressure fluid past said piston, said element having sealing surfaces in contact with said piston and the walls of said chamber and having at least one concave surface exposed directly to pressure within said chamber, said exposed surface when acted upon by increasing pressure within said chamber tending to transmit said pressure to said sealing surfaces of said element such that the sealing effect of said element increases with increasing pressure, said piston including means contacting and retaining a portion of the total sealing surface area of said sealing element such that pressure within said chamber will deform those sealing surfaces in contact against said piston retaining means.

9. A pressure seal for a piston adapted for movement in a pressure chamber to increase and decrease the volume thereof comprising a stationary element situated entirely within said chamber and adapted to seal said chamber from leakage of pressure fluid past said piston, said element having sealing surfaces in contact with said piston and the walls of said chamber and having at least one concave surface exposed directly to pressure within said chamber, said exposed surface when acted upon by increasing pressure within said chamber tending to transmit said pressure to said sealing surfaces of said element such that the sealing effect of said element increases with increasing pressure, said piston including means contacting and retaining a portion of the total sealing surface area of said sealing element such that pressure within said chamber will deform those sealing surfaces in contact against said piston retaining means, said retaining means comprising an inverted cup-shaped receptacle connected to said piston and adapted to move therewith, said receptacle having an annular depending flange and an upper transverse wall, said depending flange and transverse wall being adapted to seat adjacent sealing surfaces of said sealing element.

10. A pressure seal for a piston or the like having a portion slidably extending and movable through the wall of a pressure chamber, said piston being moveable in directions to increase and decrease the volume of said chamber said seal comprising a stationary element disposed around said portion in contact therewith and in contact with said wall through which said piston extends, with said element being and located entirely within said chamber, said element being constructed such that the pressure within said chamber tends to force said element against the piston and pressure chamber wall so that as pressure increases within said chamber, the sealing effect of said element is increased.

11. A pressure seal for a piston or the like having a portion slidably extending and movable through the wall of a pressure chamber in directions to increase and decrease the volume thereof, and having a pressure surface of relatively greater pressure area than said slidable portion located within and encompassed by said pressure chamber, said seal comprising, a stationary element disposed around said portion in contact therewith and in contact with the wall of said chamber through which said piston extends, said element being located entirely within said chamber, said element being constructed such that the pressure within said chamber tends to force said element against the piston and pressure chamber wall so that as pressure increases within said chamber, the sealing effect of said element is increased.

12. A pressure seal according to claim 11 wherein said sealing element is retained on said piston intermediate said portion of the piston forming the pressure surface and the wall of the pressure chamber through which said piston slides, such that said sealing element is maintained in compression by said piston and said chamber wall, said compression becoming greater as said piston moves toward said chamber wall in response to pressure acting upon the piston's pressure surface.

References Cited in the file of this patent

UNITED STATES PATENTS

| | | |
|---|---|---|
| 874,652 | Bailey | Dec. 24, 1907 |
| 1,938,327 | Green | Dec. 5, 1933 |
| 2,444,181 | Baldwin | June 29, 1948 |
| 2,494,598 | Waring | Jan. 17, 1950 |
| 2,759,061 | Edelman | Aug. 14, 1956 |
| 2,782,272 | Cornelius | Feb. 19, 1957 |
| 2,884,291 | Whitten | Apr. 28, 1959 |
| 2,902,557 | Brockman | Sept. 1, 1959 |
| 2,903,310 | Hill | Sept. 8, 1959 |
| 2,914,369 | Hayman | Nov. 24, 1959 |